United States Patent [19]
Silich

[11] Patent Number: 5,176,338
[45] Date of Patent: Jan. 5, 1993

[54] N-DIMENSIONAL FIGHTER AIRCRAFT

[75] Inventor: Bert A. Silich, Oswego, Ill.

[73] Assignee: The United States of America as represented by the Secretary of the Air Force, Washington, D.C.

[21] Appl. No.: 667,615

[22] Filed: Mar. 8, 1991

[51] Int. Cl.⁵ .................................... B64C 39/12
[52] U.S. Cl. .......................... 244/39; 244/45 A; 244/120; 244/90 R
[58] Field of Search .................. 244/38, 39, 45 A, 91, 244/121, 158 R, 140, 120, 90 R

[56] References Cited

U.S. PATENT DOCUMENTS

| | | | |
|---|---|---|---|
| 2,774,556 | 12/1956 | Robert | 244/120 X |
| 2,859,003 | 11/1958 | Servanty | 244/7 B |
| 2,866,608 | 12/1958 | Leonard | 244/7 B |
| 2,985,413 | 5/1961 | Von Beckh Widmanstetter | 244/140 |
| 2,986,36! | 5/1961 | Codding | 244/140 |
| 3,433,439 | 3/1969 | Brame et al. | 244/120 |
| 3,690,600 | 9/1972 | Cooper | 244/120 |
| 4,090,681 | 5/1978 | Zimmer | 244/45 R |
| 4,165,058 | 8/1979 | Whitener | 244/45 R |
| 4,312,483 | 1/1982 | Bostan | 244/12.2 |
| 4,365,773 | 12/1982 | Wolkovitch | 244/45 R |
| 4,569,493 | 2/1986 | Burhans, Jr. | 244/76 R |
| 4,736,910 | 4/1988 | O'Quinn et al. | 244/120 |
| 4,881,701 | 11/1989 | Bullard | 244/49 |
| 4,896,846 | 1/1990 | Strom | 244/45 A X |
| 4,903,917 | 2/1990 | Peller et al. | 244/39 X |
| 5,050,819 | 9/1991 | Moskovitz | 244/120 X |

OTHER PUBLICATIONS

Johnson et al. "The N-Dimensional Fighter," AIAA Student Journal, Fall Edition 1990, vol. 28, #3, pp. 12-19.

Primary Examiner—Charles A. Marmor
Assistant Examiner—Carla Mattix
Attorney, Agent, or Firm—Stanton E. Collier; Donald J. Singer

[57] ABSTRACT

An improved fighter aircraft has three primary lifting surfaces acting as wings on the airframe. The lifting surfaces are attached 120 degrees apart on the airframe so the fighter may turn in any direction without prior movements. The pilot has means to position himself to feel only positive g's in these maneuvers. A rotatable cockpit section, for example, moves independent of the airframe with the canard wings thereon. The pilot flies the cockpit section and the airframe with wings thereon responds accordingly.

3 Claims, 8 Drawing Sheets

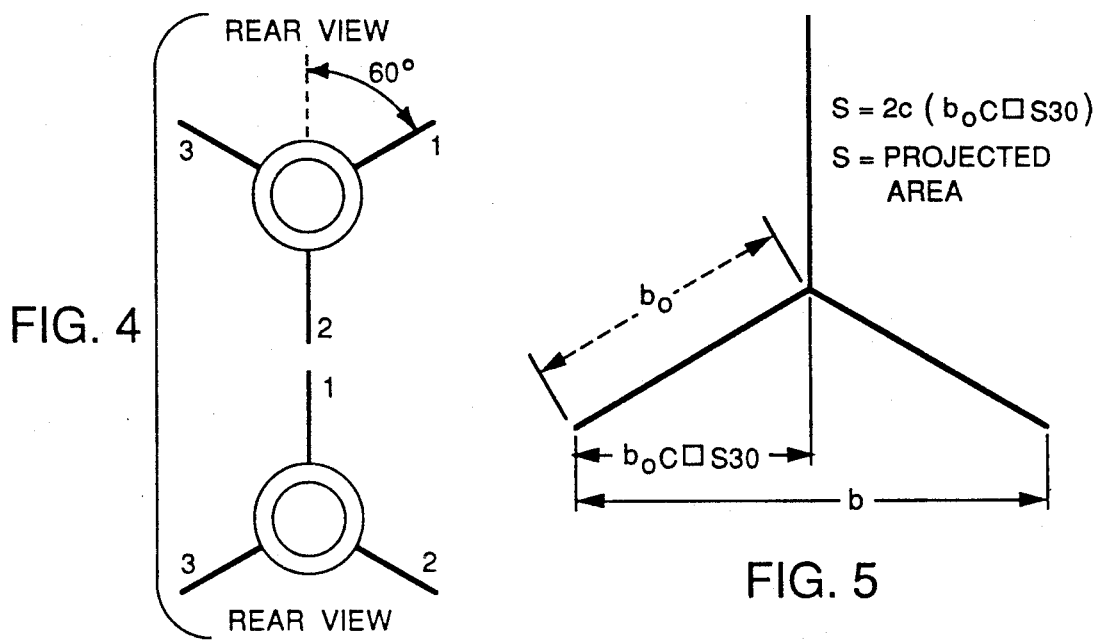
FIG. 4
FIG. 5
$S = 2c(b_o C\square S30)$
S = PROJECTED AREA
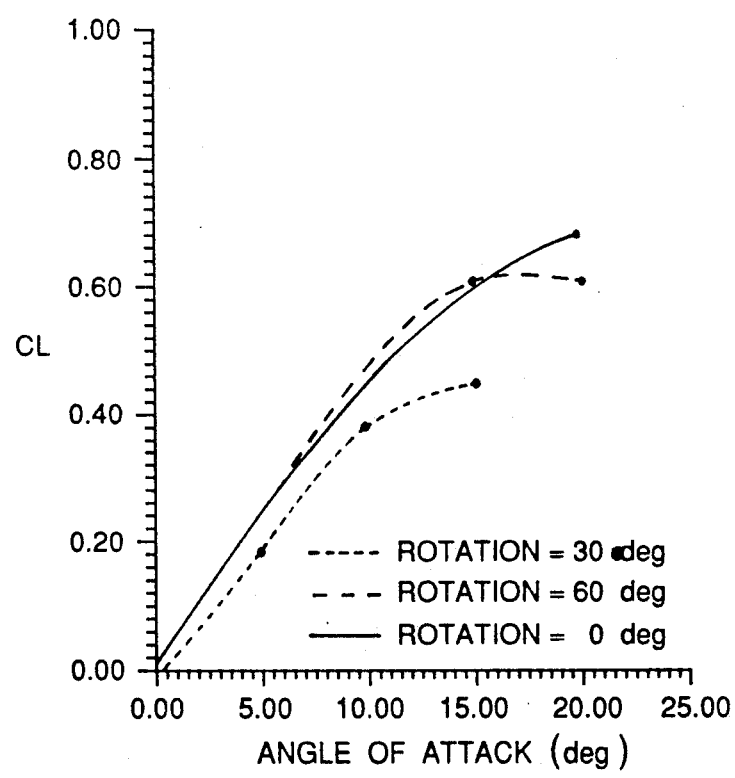
FIG. 6

N-DIMENSIONAL FIGHTER AIRCRAFT

STATEMENT OF GOVERNMENT INTEREST

The invention described herein may be manufactured and used by or for the Government for governmental purposes without the payment of any royalty thereon.

BACKGROUND OF THE INVENTION

The present invention relates to military aircraft, and, in particular, relates to fighter aircraft engaged in close-in, air-to-air combat.

In a typical combat situation, the aggressor aircraft must maneuver behind the target aircraft to lock-on to fire either short-range missiles or guns. The target aircraft must take evasive action as a result. The aggressor relies on visual cues from the target to anticipate its next position. The aggressor anticipates his prey's next move by watching the changing position of the target's wings and keeping track of nose position and changing energy levels. All things being equal, opposing pilots of equal ability with two similar aircraft starting at the same energy level, the one who is unpredictable will survive. The aircraft in the defensive position tries to remain as unpredictable as possible to deprive his potential killer of every advantage.

Present day aircraft attempting to make violent maneuvers, for example, instantly pitching downward at its maximum load, for example, can subject the pilot to blackout, headaches, bloody eyes, and even death.

The AFTI (Advanced Fighter Technology Integration)/F-16 can perform a no-nose tracking, uncoordinated side-slip maneuver by loading a side force on its vertical "canards" and its vertical stabilizer. The limits to such a maneuver, however, are the relative inefficiency of the vertical tail (compared with the wings) as a primary lifting surface and the inability of the pilot to withstand more than 3 g's of side force comfortably.

In order to keep the g force acting head to feet, in a maneuver such as a 180 degree change in direction to a lower altitude, the pilot must execute a partial barrel roll with an inside turn. Special suits are worn to counter high positive g's. These g-suits are ineffective against negative g's or side forces.

It is clear that present day aircraft are limited in the manner by which they can avoid a following aggressor. An aircraft able to perform maximum load maneuvers in any direction without subjecting the pilot to negative g's or side forces is clearly desired.

SUMMARY OF THE INVENTION

The present invention is an N-dimensional fighter aircraft for close-in combat having the ability to perform coordinated and uncoordinated maneuvers in any direction without providing visual cues, and with no adverse physiological effects on the pilot.

The present invention provides an aircraft having three primary lifting surfaces of substantially equal or equal size located at 120 degree intervals about the aircraft and further having the ability to position the cockpit in the direction of pull so that the pilot always feels substantially positive g's only head-to-foot.

The first embodiment employs three lifting surfaces as mentioned above and has a cockpit section rotatable about the main body of the aircraft. A pair of canards, for example, provide the turning moment to the cockpit section. The pilot "flies" the cockpit section with the three lifting surfaces appropriately adjusting thereto to cause the main body to move in the direction desired by the pilot as indicated by the position of the cockpit section.

The second embodiment employs the three lifting surfaces as mentioned previously but the three lifting surfaces are attached to an outer housing that rotates upon the main body, airframe, of the aircraft. The main body is rotated in response to the pilot's desire by means of canards.

The third embodiment employs, again, the three lifting surfaces as previously mentioned. The cockpit section rotates on a spindle which is a part of the main body but has a nose section that does not rotate therewith.

Therefore, one object of the present invention is to provide an N-dimensional fighter aircraft.

Another object of the present invention is to provide a N-dimensional fighter aircraft having three substantially equal lifting surfaces positioned 120 degrees about the aircraft.

Another object of the present invention is to provide an N-dimensional fighter aircraft having a cockpit section that moves independently of the three lifting surfaces.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 4 illustrates numbering and angle definition of the lifting surfaces.

FIG. 5 illustrates the lifting surface of the wings.

FIG. 6 is a graph of coefficient of lift as a function of angle of attack.

DESCRIPTION OF THE PREFERRED EMBODIMENT

Figure 1A:
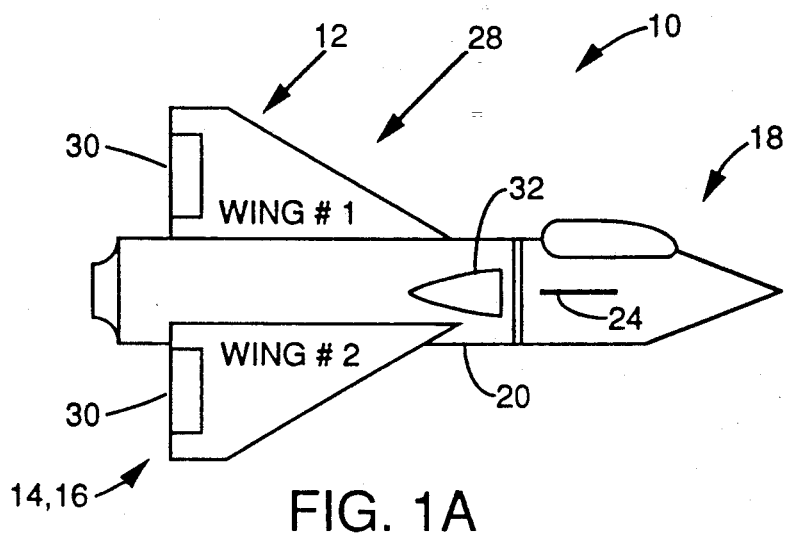
FIGS. 1A to 1D illustrate schematically one embodiment of an N-dimensional fighter aircraft.
Figure 1B:
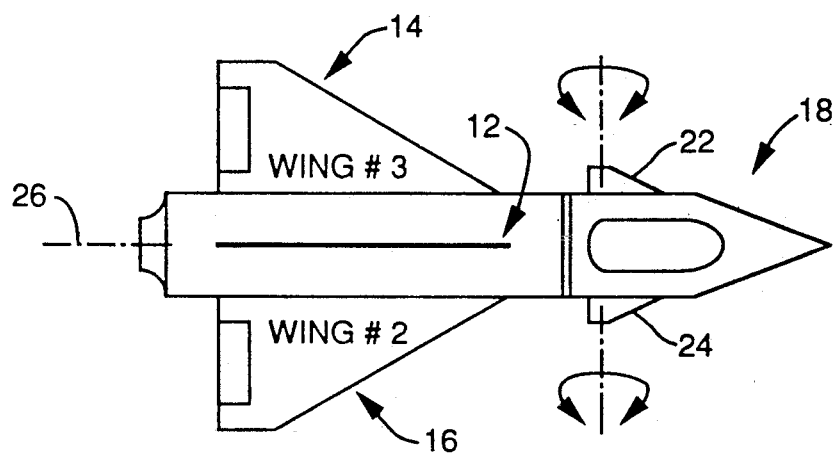
Figure 1C:
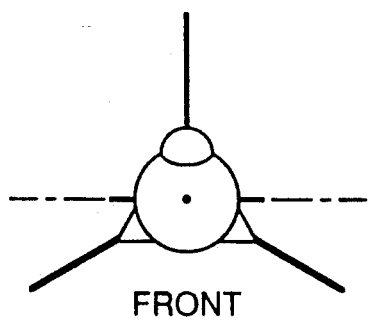

Referring to FIG. 1A, a N-dimensional fighter (NDF) aircraft 10 is shown.

The aircraft 10 has three primary lifting surfaces, hereinafter referred to as wing or wings as appropriate, of equal size located at 120 degree intervals. This allows the aircraft 10 to place its lift vector anywhere in 360 degrees nearly instantaneously with minimum or no roll required in any direction (up, down, left, or right) with a full load on the wings and with no roll required.

A cockpit section 18 rotates about a main body 20 using differential canards 22 and 24 to place the pilot in the desired direction of pull for an intended maneuver. Rotation occurs about a longitudinal axis 26 of the aircraft 10, independent of the wing system 28 trailing behind. The cockpit section 18 will not require any actuation devices in these embodiments as it has the full ability to "fly" itself to the desired position using the stream energy and the differential canard deflections. The purpose of rotating the cockpit section 18 with the canards 22 and 24 is to keep the pilot feeling only positive gravitational acceleration aligned head to toe. The canards 22 and 24 set the direction and magnitude of the angle of attack on the wing system 28. The control surfaces 30 on the wings will compliment the desired maneuver and roll the system to the optimum attitude for any given maneuver.

Unlike the AFTI/F-16's unique control system requiring a specially trained pilot, the NDF pilot simply flies his cockpit, and the wing system 28 interprets his control inputs. For example, the pilot would input and hold full cross controls to do the side-slip maneuver, i.e., "aileron" (stick) input to position the pilot's head in the direction of the maneuver by rolling the cockpit followed by full opposite "rudder" (pedal) deflection. The pilot will not have to be concerned with the attitude of the three-wing system behind him; he simply flies the cockpit just as he has been trained to fly a conventional aircraft, the pilot will only have to adapt to the magnified results of a full-deflection, cross-control input (i.e., the side-slip maneuver).

Figure 1D:
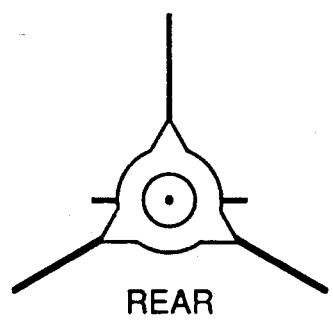

The abilities of the NDF aircraft 10 put its pilot at an advantage in an air-to-air environment. Defensively, the aircraft will be able to turn in any direction without telegraphing its move like a conventional aircraft. As difficult as it is to track a conventional target as it rolls its planform to be loaded in the direction of turn, the NDF aircraft 10 will be nearly impossible to follow. The aircraft is always within 30 degrees of a symmetrically loaded configuration and could even roll opposite the direction of turn or slip. As the cockpit rolls in one direction to enter a maneuver, the wings could possible roll the other way, throwing a "hip-fake" at the trailing aggressor. Visual tracking of the cockpit would be the only way to anticipate the aircraft's next move. The position of the relatively small cockpit can be masked by the wing system when the aircraft is viewed from behind. See FIG. 1D. In fact, the entire nose section could be deceptively painted to disguise the cockpit's actual position.

The aircraft's ability to do sudden, unconventional maneuvers helps it both defensively and offensively. Sudden lateral displacement from the flight path creates evasive options previously unavailable. The complete control of nose tracking from any flight attitude provides obvious benefits in the offensive role.

Additional features such as wing-tip speed brakes could be used for large or emergency nose track augmentation or speed braking; vectored thrust could add to the high maneuverability of this aircraft; strakes could also augment the NDF's high-angle-of-attack capability.

The following patents and articles are incorporated by reference: U.S. Pat. No. 3,690,600 discloses a rotatable nose section; U.S. Pat. No. 3,433,439 discloses a movable nose section with electronics therein; U.S. Patent discloses a plane with multi-wings and folding wings; U.S. Pat. No. 4,569,493 discloses an aircraft with control canards, a flight control system, and rotatable wings; and U.S. Pat. No. 4,736,910 discloses a manner of connecting two fuselage sections together. Johnson et al., "The N-Dimensional Fighter," AIAA Student Journal, Vol. 28, No. 3, Fall 90, pp 12 to 19, discusses the N-Dimensional Fighter.

In the present embodiment, the cockpit section would be free to roll 360 degrees. It will have the capability to be locked during take-off and landings and in flight. Electrical connections could be made through the center of rotation, by brush type contacts, and by a transmitter and receiver system. Hydraulic power would be supplied by a method similar to that used in a variable pitch propeller. Air intakes 32 would be mounted on the main body but other configurations are possible. Only one intake 32 is shown. A full circular intake could be provided directly behind the cockpit section. Another configuration is to mount a single intake under the pilot on the rotatable nose section. These would act to confuse the attacking aircraft if they resembled the cockpit canopy or blocked the rearward view.

Landing gear, not shown, would have to be extended to clear the wings. The extra length required is not unreasonable. The wings could also partially fold upwards, similar to many Navy aircraft, during landing for the use of conventional landing gear.

Figure 2A:
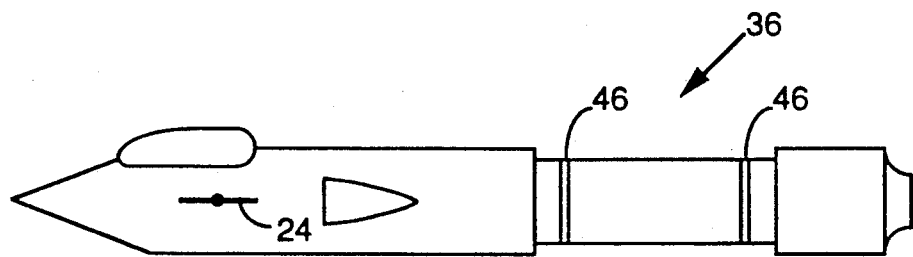
FIGS. 2A to 2B illustrate a second embodiment.
Figure 2B:
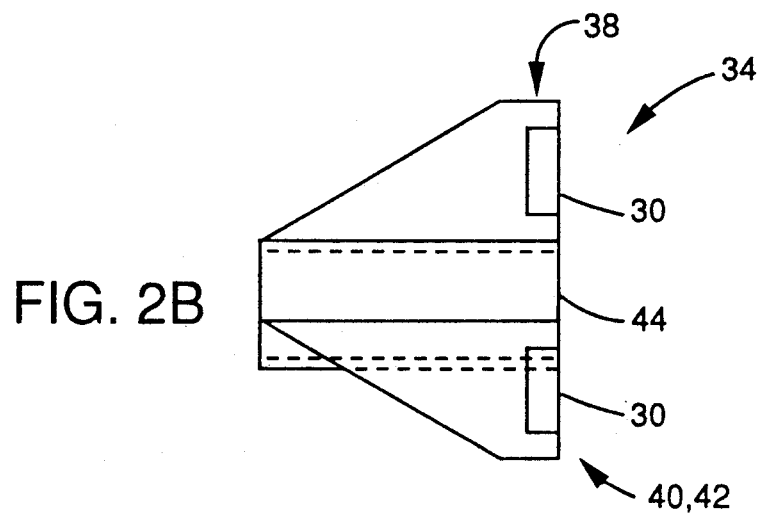

FIGS. 2A and 2B illustrate the embodiment wherein a wing system 34 rotates on an airframe 36. Wings 38, 40 and 42 are attached to a cylindrical section 44 which would rotate on circular tracks 46. The control surfaces 30 in the wings would be mechanically/hydraulically controlled. The cylindrical section 44 would be capable of a 360 degree roll about the airframe 36. It will also have the capability to be locked for take-off and landing, and in flight. The canards 22 and 24 provide the rolling moment to the airframe 36 but considering the larger mass than the cockpit section 18 additional assistance may be needed for quicker reaction such as larger canard size.

Figure 3A:
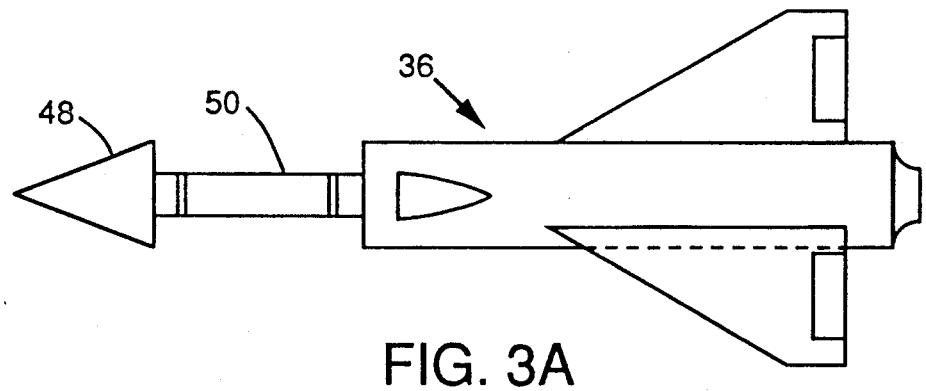
FIGS. 3A to 3B illustrate a third embodiment.
Figure 3B:
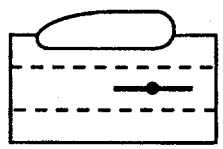

The embodiment seen in FIGS. 3A and 3B is similar to that in FIGS. 1A, etc. except a nose cone 48 would be attached to the airframe 36. Cockpit clearance would be limited by a spindle 50 diameter therein and could possibly require cockpit redesign.

In order to substantiate the operating characteristics of the NDF aircraft 10 wind-tunnel testing of models was performed. The first step was basic aircraft sizing. This led to a determination of the optimum lifting configuration. An analysis of the overall forces and moments produced by the NDF system at different flight attitudes was then tested. The next step was to analyze the integrated effects of all possible control surface deflections throughout a range of flight attitudes. All steps were highlighted by the use of a flying model glider.

The configuration of the NDF aircraft 10 requires definition of a different convention to describe "bank" angle. FIG. 4 shows the standard designed. The reference position is the desired position of the lift vector perpendicular to the flight path or the vertical, whichever is the wing closest to the specified reference position. The wings are numbered 1 to 3, starting with the reference wing and moving clockwise as viewed from the rear. A reference wing will always be within 60 degrees of the desired lift vector. A rotation to the right of the reference position is positive (consistent with the right-hand rule).

The planform area of an aircraft must be defined for sizing purposes and performance calculations, and as a reference for force and moment coefficients. Very few aircraft exist for analyses that are configured with the wings mounted at a significant angle (30 degrees or greater) from the horizontal (an/dihedral). There are not many aircraft that fly with the wings at different an/dihedral angles. All three of the NDF's wings can be at different angles relative to the lift vector at any given time.

The basic premise is that the effective lifting area or planform area of any single wing is the projection of the lifting surface into the plane perpendicular to the desired lift vector. The total effective lifting area is the sum of each of these projections. For example, the effective area of the zero rotation configuration is the projections of wings 2 and 3, FIG. 5. The reference area used was determined to be that of zero rotation angle.

The complex nature of these tests required a special mathematical method to be applied to the data to develop useful empirical models. Experimental design is a systematic approach to changing inputs of a process so that their combined effects are more completely understood. Data points are used to perform a regression relating all possible variables. The mathematical model obtained from this can be used as an empirical model for the data taken within a certain degree of confidence.

The NDF aircraft 10 was based on its being comparable in size to the F-16 and its using a similar-sized engine. The fuselage of the wind-tunnel model was proportioned to resemble a typical small fighter. Zero rotation was predicted to be the optimum lifting attitude and this planform area using the projection theory and a mean aerodynamic chord of 11 feet was used as the standard for sizing. All estimations for wing sizing were kept on the small side to help alleviate some of the drag associated with placing an entire wing into the slipstream. The NDF has an individual wing span, $b_o$, of 10.8 feet, as compared with the F-16's half span of 15.5 feet.

The NDF aircraft 10 dimensions were chosen in part by the results of the sizing process shown in Table 1. This sizing is the result of a constraint analysis using a computer program. The program uses specific mission and performance parameters to arrive at a relationship between thrust loading and wing loading. The sizing estimation was based on the following specific performance parameters:

TABLE 1

| SIZING RESULT | |
|---|---|
| T/W | 1.24 lbf/lbw |
| W/S | 85 lb/ft |
| Max Thrust | 25,000 lb |
| Planform area | 235 ft$^2$ |
| $W_{TO}$ | 20,000 lb |
| $b_o$ | 11.3 ft |
| b | 19.6 ft |
| Maximum Mach: | 1.6 at 30,000 ft |
| Dry cruise Mach: | 0.8 at 30,000 ft |
| Combat Mach: | 0.5-0.9 at 20,000 ft, 9 g max. |
| Landing: | 3,000 ft ground roll |

Wind-Tunnel Test 1: Optimum Lifting Configuration

At any given time any one of the three wings can be loaded in nearly any direction with the angle of attack on each being different. A wing positioned at any angle away from horizontal will see less of an effective angle of attack than a conventional horizontal wing. The benefit of this phenomenon is that the fuselage can be rotated beyond the angle that would otherwise be the critical angle of attack thus allowing more effective nose tracking in an air-to-air environment.

Wings not perpendicular to the lift vector will have spanwise flow characteristics that will affect that particular wing's lifting ability at higher angles of attack. The "anhedral" of a zero rotation would result in spanwise flow from the wing tips in toward the center of the fuselage, somewhat like an inverted wedge "channeling" the flow toward the center. Likewise, the other extreme, 60 degree rotation (two wings up at 30 degrees dihedral), would result in spanwise flow toward the wing tips.

This aircraft in a nonsymmetric configuration (30 degree rotation, for example) will have a couple produced by the two skewed wings about the longitudinal axis causing a moment. This moment will work to counteract the lift of the wing nearest the horizontal. Even though the projected area of a configuration other than zero- or 60 degree rotation is greater, this couple is predicted to detract from the overall lift available from the system. The net rolling effect of this moment is difficult to speculate about and will be addressed in the discussion of Wind-Tunnel Test 2.

All the points mentioned so far suggest that the optimum lifting configuration will be symmetric about the standard X-Z plane. The inward spanwise flow on the zero-lift configuration will minimize the air spilling over the wing tips into the lower pressure air above the wing. These considerations suggest that the most efficient configuration that will allow the highest $C_{Lmax}$ is zero rotation.

Test 1 was designed to find the configuration with the highest $C_{Lmax}$. A simple straight-winged model was tested at rotation angles of 0, 30 and 60 degrees at pitch angles up to 20 degrees. A maximum of 60 degree rotation was used because testing angles greater than 60 degrees would be redundant. FIG. 6 depicts results of the test. The predicted optimum lift configuration of zero rotation was confirmed.

The highest measured $C_L$ value for the zero-rotation configuration of 0.683 is most likely not truly $C_{Lmax}$. The trend on the graph suggests that, unlike the other two configurations tested, the maximum angle of attack for zero rotation is above 20 degrees (maximum angle of attack used). $C_{Lmax}$ is actually higher. This finding further supports the prediction that the most lift is available from zero rotation.

An interesting point to note is that through the near-linear range, zero- and 60 degree rotation are comparable in performance, with 60 degree actually being slightly better at certain points. However, the $C_L$ for 60 degrees drops off much earlier and sharper than the zero rotations, making zero rotation the better choice for those maneuvers that demand the most available lift from the system. The control surfaces would need to rotate the wing system to a zero rotation when the lift demanded of them exceeds that available from the existing rotation angle.

Wind-Tunnel Test 2: Force and Moment Relations

The purpose of Test 2 was to find relationships for the forces and moments to the rotation angle and pitch angle of a simplified, rigid (no control surface deflections) test model. A theoretical relationship model had to be developed based on geometry and simple two-dimensional wing theory. This method provided a prediction of the relationship between rotation angle, pitch angle, and all six force and moment coefficients. All predicted relationships seemed to match conventional theoretical trends (linear $C_L$, parabolic drag polar, etc.). A possible problem became visible in the side force, yaw, and rolling relationships, with a transition from a symmetric (zero rotation) to nonsymmetric configuration. A slight side force and yawing and rolling moments appeared in this region. The possibility of adverse yawing or rolling tendencies merited attention and the testing was designed to determine the magnitude of these effects.

This test was set up to obtain enough data points over an adequate range to apply experimental design to the development of a statistically acceptable empirical model of the force and moment relationships. The outcome of such an application is six continuous equations, each defining one of the six coefficients with a high as second-order (quadratic) interactions between the two variables (rotation and pitch). These equations are valid throughout the entire domain tested. The entire range of rotation angles (0-60 degrees) was tested with up to 10 degrees of pitch. The same model was used as in the first test.

Since the mathematical prediction theory used idealized three-dimensional wings and ignored their interactions with each other as well as the forebody effects, it is not quantitatively accurate. However, comparison with the actual data revealed that the trends matched quite well.

The aforementioned adverse yaw and rolling tendencies turned out to be negligible. Surprisingly, both the rolling and yawing moments were negligible at all rotation angles. Therefore, transition from one rotation to another can occur smoothly and without coupling problems. Current technology available for flight systems would be adequate to control this aircraft.

Equations for the six coefficients (lift, drag, side force, roll, pitch, and yaw) were developed by applying the theory of experimental design, and were found to be intuitively reasonable. Each coefficient could be represented by a second-order polynomial function of both pitch and roll.

Wind-Tunnel Test 3: Control Surface Deflection Effects

The third test was conducted to study the effects of any given combination of control surface deflections over a range of aircraft attitudes. The purpose of the test was to show that a proper combination of control surface deflections will result in an aircraft capable of maneuvering in any manner from any attitude. The object here was to provide useful relationships of control surface deflections and aircraft attitudes to all force and moment coefficients. The relationships developed from this effort can be used to further analyze the flight control inputs required by the NDF aircraft 10's unique configuration.

The only theory available for predicting the outcome of any given test was simple intuitive reasoning. It is helpful to relate any given deflection on the NDF to analogous deflection on a conventional aircraft. For example, the net effect of a deflection on wing 1 at zero rotation is comparable to that of a conventional rudder.

A standard had to be set to define positive and negative deflections on any given wing. For a given wing, a positive control surface deflection is that deflection which would result in a positive rolling moment. For example, wing 1 at zero rotation has a positive deflection to the left when viewed from the rear. A deflection that would cause an individual wing to move to a greater rotation angle is positive.

This test was also designed to obtain enough data point over an adequate range to apply experimental design to the development of a statistically acceptable empirical model. The outcome of this application is six continuous equations shown in Tables 2 to 7, each defining one of the six force and moment coefficients with as high as three-way interactions between each of the five variables (three individual wing deflections, rotation, and pitch). Again, these equations are valid throughout the domain tested.

The testing domain included rotation angles from 0 to 60 degrees. A larger domain was not required because angles greater than 60 degrees were redundant due to symmetry.

Control surface deflections of 15 degrees were used to try to keep every wing within its near-linear range throughout the test. The assumption was made that a downward deflection greater than this on a horizontal control surface could increase the effective angle of attack and place that wing near a stall. This was also the reasoning behind limiting the pitch in the test to 10 degrees.

Despite the incredible number of possible test points, the application of experimental design required only 55 combinations of deflections, rotation, and pitch to develop a statistically reliable empirical mode. Testing of all 243 possible data points would have given a "full factorial" model.

In the deflection test, wings were swept and designed with detachable trailing-edge control surfaces that allow a possibility of three deflection angles on each wing. $-15$, 0, or $+15$ degrees.

In the third test statistically accurate equations were developed relating all individual force and moment coefficients to all time variables (pitch, rotation angle, and wing deflections). The equations were all third-order polynomials. To test the reliability of the developed equations, a number of simple scenarios were stepped through to visualize aircraft response. All variables except one deflection were held constant and the empirical model was used to calculate specific coefficients.

Scenarios were run through that deflected both vertical and horizontal surfaces, analogous to a conventional aircraft deflecting its rudder or elevator. The empirical model provided intuitively correct results, i.e., positive deflection on a vertical wing-positive side force, negative yaw.

Figure 7:
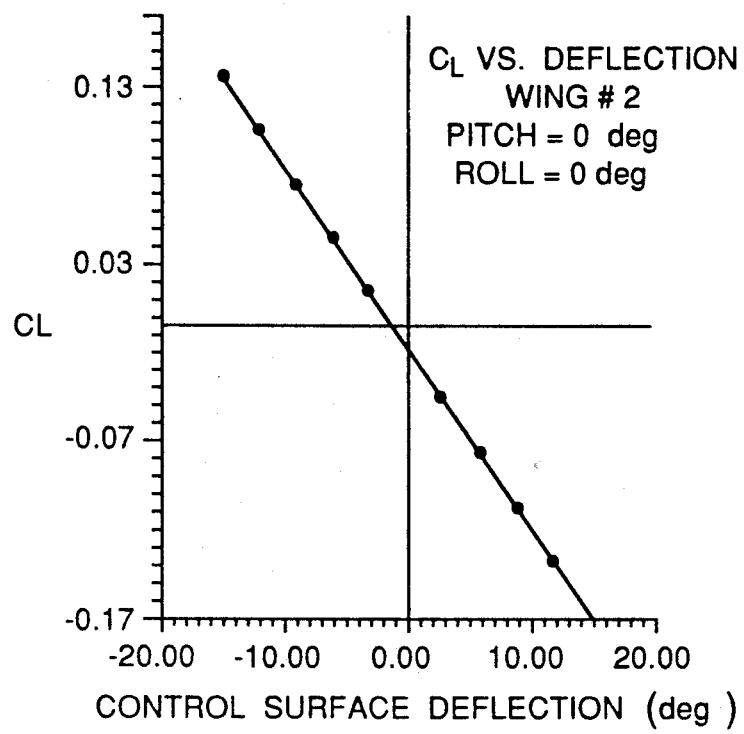
FIG. 7 is a graph of coefficient of lift as a function of control surface deflection in the wings.
Figure 8:
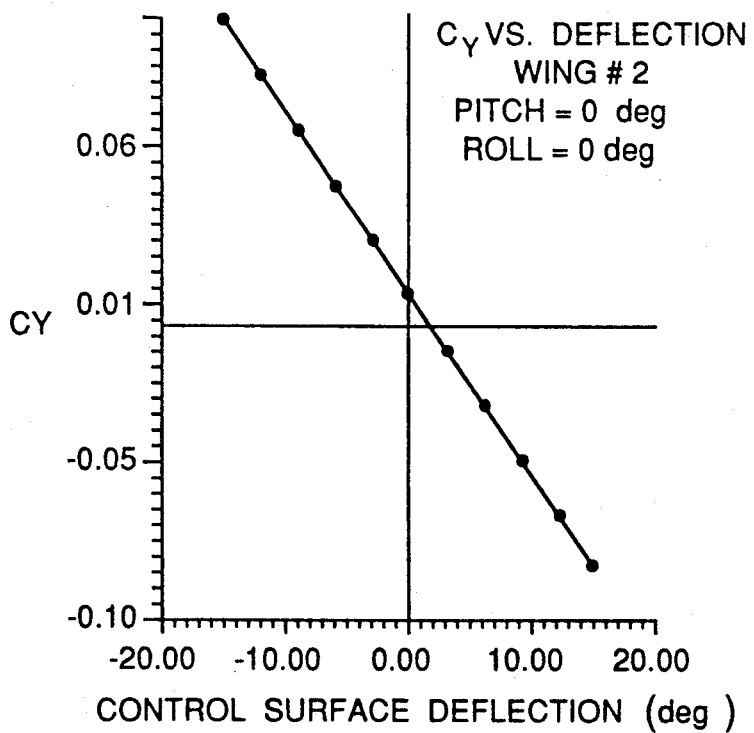
FIG. 8 is a graph of yaw coefficient as a function of control surface deflection.
Figure 9:
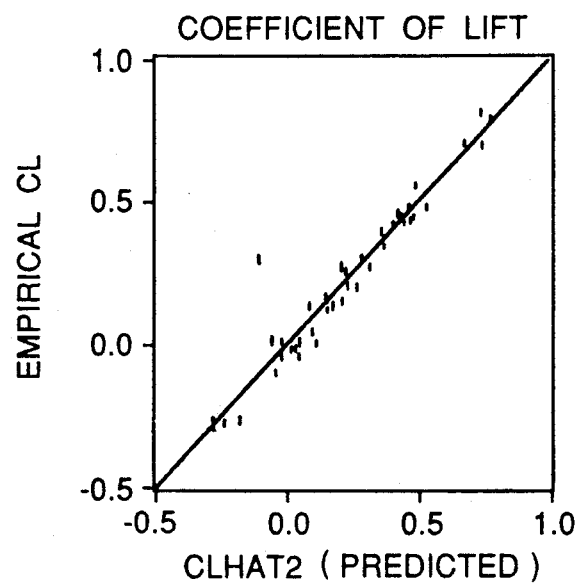
FIGS. 9 to 14 are graphs of wind tunnel data and the best fit curves for various dependent variables.
Figure 10:
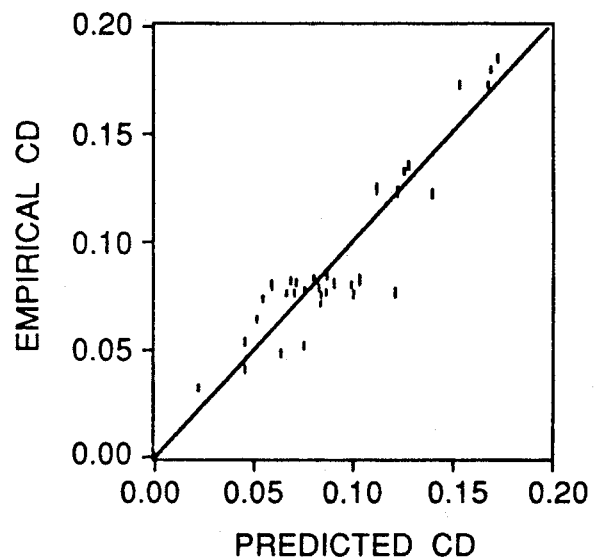
Figure 11:
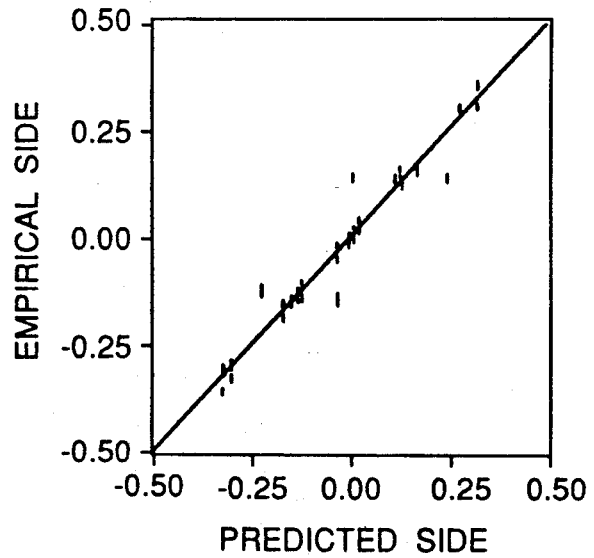
Figure 12:
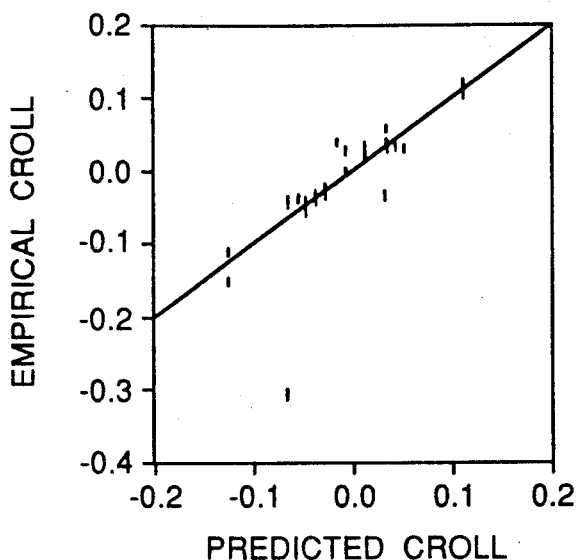
Figure 13:
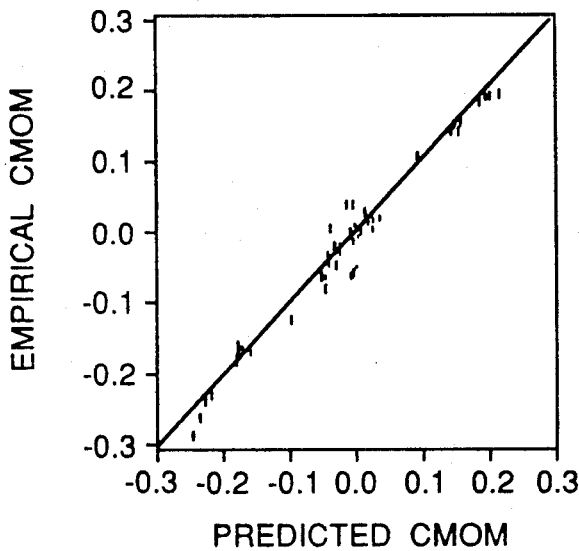
Figure 14:
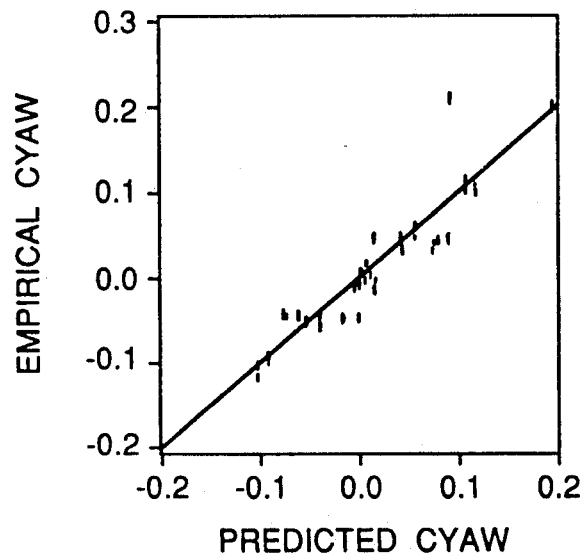
Figure 15:
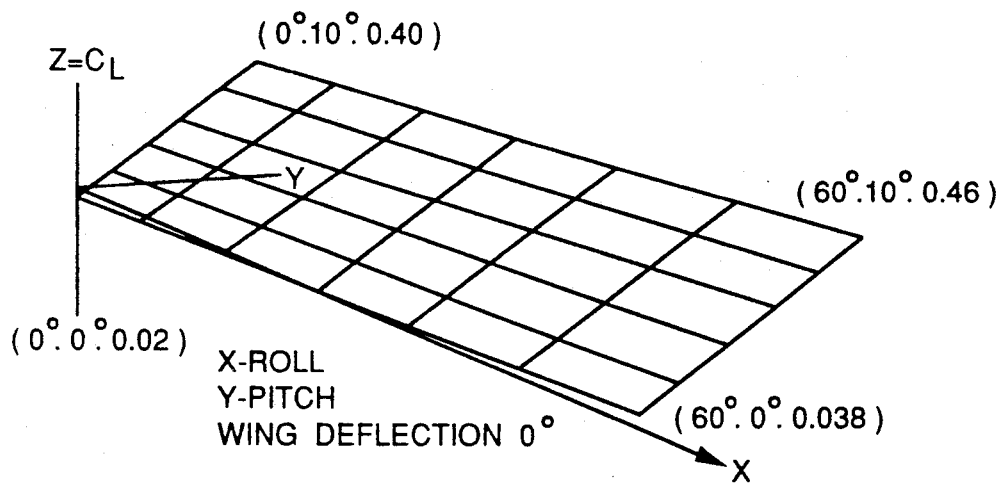
FIGS. 15 to 20 are graphs which illustrate control for each of the six force and moment coefficients.
Figure 16:
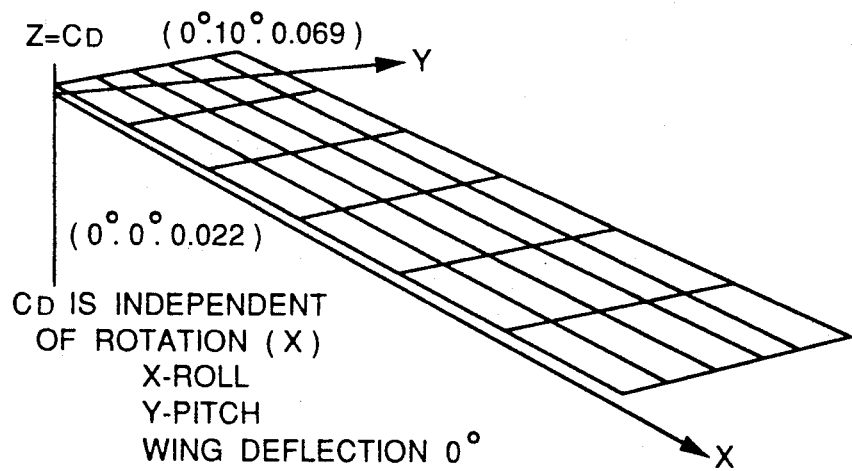
Figure 17:
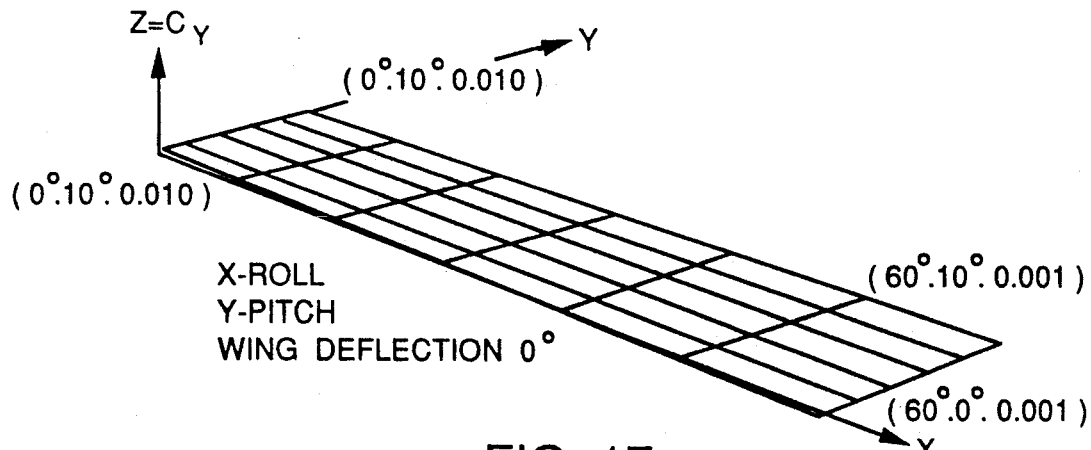
Figure 18:
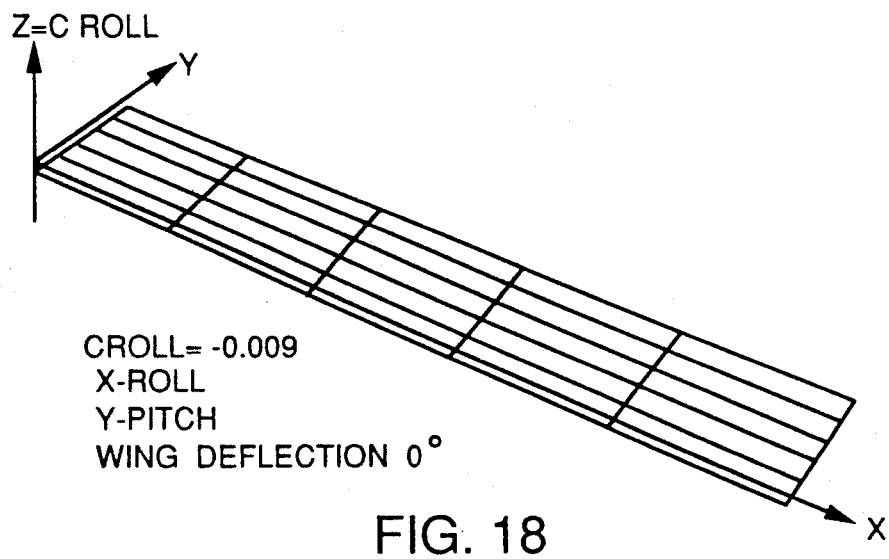
Figure 19:
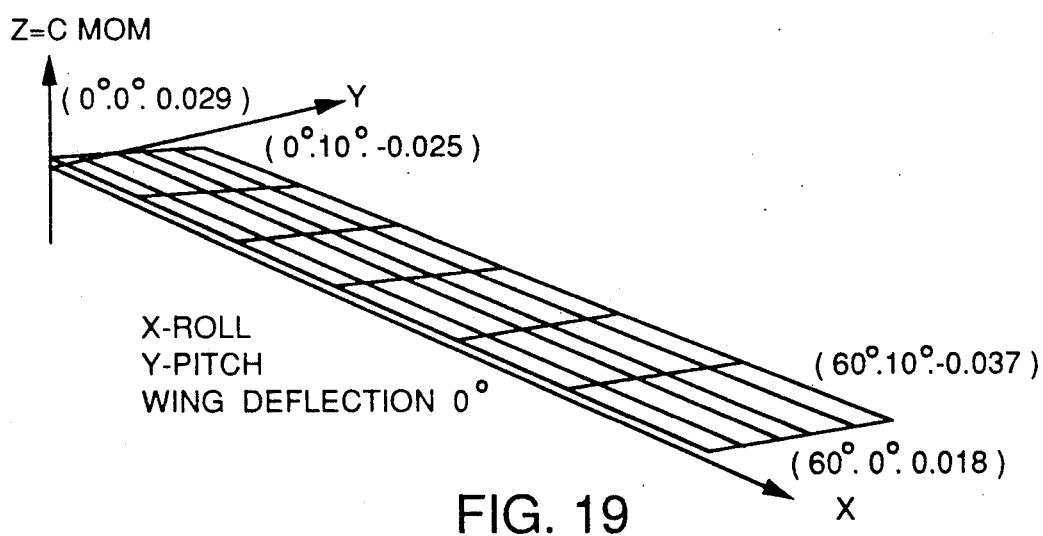
Figure 20:
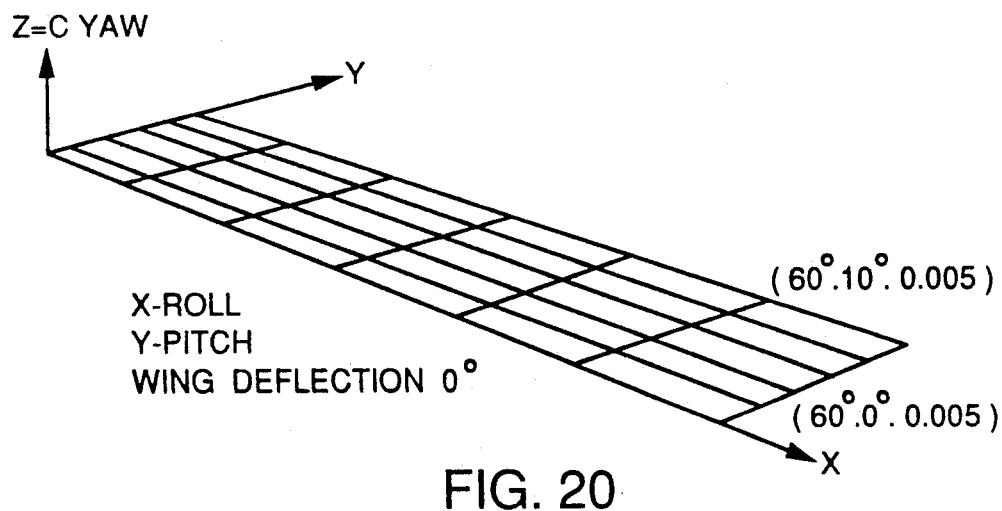

One scenario for observation involved looking at a wing out of the horizontal and vertical planes. With the aircraft at zero rotation and all variables held at zero, a deflection on wing 2 will result in both vertical and horizontal components of force. A negative deflection (trailing edge deflected down) would intuitively cause a force directed upward and to the right. FIGS. 7 and 8 show that the empirical model again agreed with intuitive reasoning.

Many similar scenarios were analyzed and found to be equally reasonable. One can only assume that since the equations work with a single wing deflected, and with the statistical accuracy of their derivations, that they are also reliable when the coupling terms are brought into play.

Tables 1 to 7 and FIGS. 9 to 14 provide information as to several dependent variables examined during wind-tunnel testing and the best fit lines to the data obtained for each by mathematical analysis. The variables are written in orthogonal terms, e.g., pitch=$0°$ means input pitch=$-1$, pitch=$5°$ means input pitch=$0$, etc. Graphs 15 to 20 shown that there is no adverse behavior for each of the six force and moment coefficients.

TABLE 1
List of Symbols and Abbreviations

| | |
|---|---|
| a | Speed of sound |
| AOA | Angle of Attack |
| b | Span |
| c | Chord |
| c.g. | Center of Gravity |
| $C_D$ | Coef of drag in stability axis |
| $C_{Do}$ | Coeff of drag for AOA = 0 degrees, elevator deflection = 0 degrees, stabilizer deflection = 0 degrees. |
| $C_L$ | Coef. of lift in stability axis |
| $C_l$ | Rolling moment Coef in body axis |
| $C_m$ | Pitching mom. coef in stab. axis |
| $C_n$ | Yawing mom. coef. in body axis |
| $C_y$ | Side force coef. in stab. axis |
| DAS | Data acquisition System |
| L | Lift |
| M | Mach |
| m | meters |
| MAC | Mean aerodynamic chord |
| NACA | Nat. Adv. Committee of Aeronautics |
| PIT | Pitch in orthogonal terms: 0 deg = −1, 30 deg = 0, 60 deg = 1 |
| q | Dynamic pressure |
| ROT | Rotation in orthogonal terms: 0 deg = −1, 30 deg = 0, 60 deg = 1 |
| s | Planform area |
| t | Thickness |
| v | velocity |
| WD1, WD2, WD3 | Wing deflections of wings 1, 2 and 3 |

TABLE 2
VARIABLE $C_L$

| VARIABLE | CO-EFFICIENT | STD. ERROR | T-STAT. | 2-TAIL SIG. |
|---|---|---|---|---|
| C | 0.2209660 | 0.0114022 | 19.379293 | 0.000 |
| PITCH | 0.2131147 | 0.0138272 | 15.412758 | 0.000 |
| ROT | 0.0298382 | 0.0138272 | 2.1579436 | 0.037 |
| WD1 | −0.0564559 | 0.0138272 | −4.0829695 | 0.000 |
| WD2 | −0.0834559 | 0.0138272 | −6.0356478 | 0.000 |
| WD3 | 0.1341588 | 0.0138272 | 9.7025567 | 0.000 |
| RW1 | −0.0492156 | 0.0142527 | −3.4530710 | 0.001 |
| RW2 | 0.0515156 | 0.0142527 | 3.6144437 | 0.001 |
| PW1 | −0.0279406 | 0.0142527 | −1.9603724 | 0.057 |
| PW3 | 0.0232156 | 0.0142527 | 1.6288565 | 0.111 |

| | | | |
|---|---|---|---|
| R-squared | 0.913220 | Mean of dependent var | 0.220966 |
| Adjusted R-squared | 0.893694 | | |
| S.E. of regression | 0.080626 | S.D. of dependent var | 0.247283 |
| Durbin-Watson stat | 2.115213 | Sum of squared resid | 0.260019 |
| Log likelihood | 60.52867 | F-statistic | 46.77036 |

TABLE 3
VARIABLE $C_D$

| VARIABLE | CO-EFFICIENT | STD. ERROR | T-STAT. | 2-TAIL SIG. |
|---|---|---|---|---|
| C | 0.0455210 | 0.0036843 | 12.355541 | 0.000 |
| PIT | 0.0235706 | 0.0024440 | 9.6442398 | 0.000 |
| ROT | 0.0001059 | 0.0024440 | 0.0433232 | 0.966 |
| WD1 | −0.0076651 | 0.0024451 | −3.1349311 | 0.003 |
| WD2 | −0.0061146 | 0.0024550 | −2.4906524 | 0.017 |
| WD3 | 0.0093853 | 0.0024440 | 3.8401264 | 0.000 |
| PW1 | −0.0080781 | 0.0025192 | −3.2065919 | 0.003 |
| PW3 | 0.0115844 | 0.0025192 | 4.5983894 | 0.000 |
| RW1 | −0.0081281 | 0.0025192 | −3.2264389 | 0.003 |
| RW2 | 0.0077906 | 0.0025192 | 3.0924698 | 0.004 |
| WD12 | 0.0289324 | 0.0075078 | 3.8536224 | 0.000 |
| WD32 | 0.0283751 | 0.0074977 | 3.7845145 | 0.001 |

| | | | |
|---|---|---|---|
| R-squared | 0.897525 | Mean of dependent var | 0.084490 |
| Adjusted R-squared | 0.867862 | | |
| S.E. of regression | 0.014251 | S.D. of dependent var | 0.039204 |
| Durbin-Watson | 2.528534 | Sum of squared resid | 0.007717 |

TABLE 3-continued
VARIABLE $C_D$

| stat | | resid | |
|---|---|---|---|
| Log likelihood | 148.4608 | F-statistic | 30.25672 |

TABLE 4
VARIABLE $C_y$

| VARIABLE | CO-EFFICIENT | STD. ERROR | T-STAT. | 2-TAIL SIG. |
|---|---|---|---|---|
| C | 0.0047371 | 0.0099963 | 0.4738856 | 0.638 |
| WD1 | 0.1101249 | 0.0068038 | 16.185794 | 0.000 |
| WD2 | −0.1061458 | 0.0068038 | −15.600950 | 0.000 |
| RW1 | −0.0374479 | 0.0069522 | −5.3865065 | 0.000 |
| RW2 | −0.0294479 | 0.0069522 | −4.2357885 | 0.000 |
| RW3 | 0.0893854 | 0.0069522 | 12.857196 | 0.000 |
| ROT | −0.0053823 | 0.0067446 | −0.7980241 | 0.430 |
| WD3 | −0.0071961 | 0.0067446 | −1.0669393 | 0.292 |
| WD12 | −0.1472522 | 0.0288927 | −5.0965104 | 0.000 |
| WD22 | 0.1340604 | 0.0288927 | 4.6399308 | 0.000 |

| | | | |
|---|---|---|---|
| R-squared | 0.950697 | Mean of dependent var | −0.004233 |
| Adjusted R-squared | 0.939804 | | |
| | | S.D. of dependent var | 0.160026 |
| S.E. of regression | 0.039327 | Sum of squared resid | 0.061866 |
| Durbin-Watson stat | 2.849690 | F-statistic | 85.70089 |
| Log likelihood | 96.42334 | | |

TABLE 5
VARIABLE $C_{roll} = C_l$

| VARIABLE | CO-EFFICIENT | STD. ERROR | T-STAT. | 2-TAIL SIG. |
|---|---|---|---|---|
| C | −0.0089867 | 0.0057803 | −1.5547049 | 0.127 |
| WD1 | 0.0398768 | 0.0070127 | 5.6863802 | 0.000 |
| WD2 | 0.0304768 | 0.0070127 | 4.3459513 | 0.000 |
| WD3 | 0.0502451 | 0.0070096 | 7.1679930 | 0.000 |

| | | | |
|---|---|---|---|
| R-squared | 0.687482 | Mean of dependent var | −0.008987 |
| Adjusted R-squared | 0.667101 | | |
| | | S.D. of dependent var | 0.070840 |
| S.E. of regression | 0.040873 | Sum of squared resid | 0.076847 |
| Durbin-Watson stat | 2.121089 | F-statistic | 33.73058 |
| Log likelihood | 91.00200 | | |

TABLE 6
VARIABLE $C_{mom}$

| VARIABLE | CO-EFFICIENT | STD. ERROR | T-STAT. | 2-TAIL SIG. |
|---|---|---|---|---|
| C | −0.0038192 | 0.0054690 | −0.6983381 | 0.489 |
| PIT | −0.0271961 | 0.0036900 | −7.3702439 | 0.000 |
| ROT | −0.0056863 | 0.0036900 | −1.5410026 | 0.131 |
| WD1 | 0.0453722 | 0.0037224 | 12.189044 | 0.000 |
| WD2 | 0.0437736 | 0.0037224 | 11.759596 | 0.000 |
| WD3 | −0.0974510 | 0.0036900 | −26.409596 | 0.000 |
| PW1 | 0.0064688 | 0.0038035 | 1.7007148 | 0.097 |
| RW1 | 0.0472187 | 0.0038035 | 12.414394 | 0.000 |
| RW2 | −0.0490729 | 0.0038035 | −12.901881 | 0.000 |
| WD12 | −0.0469313 | 0.0158073 | −2.9689680 | 0.005 |
| WD22 | 0.0372145 | 0.0158073 | 2.3542621 | 0.024 |

| | | | |
|---|---|---|---|
| R-squared | 0.972014 | Mean of dependent var | −0.010427 |
| Adjusted R-squared | 0.964838 | | |
| | | S.D. of dependent var | 0.114744 |
| S.E. of regression | 0.021516 | | |
| Durbin-Watson stat | 2.717848 | Sum of squared resid | 0.018055 |
| Log likelihood | 127.2123 | F-statistic | 135.4564 |

TABLE 7

| VARIABLE $C_{Y_{aw}}$ | | | | |
|---|---|---|---|---|
| VARIABLE | CO-EFFICIENT | STD. ERROR | T-STAT. | 2-TAIL SIG. |
| C | −0.0003420 | 0.0063905 | −0.0535183 | 0.958 |
| ROT | 0.0056275 | 0.0043117 | 1.3051612 | 0.199 |
| WD1 | −0.0314522 | 0.0043495 | −7.2311449 | 0.000 |
| WD2 | 0.0389105 | 0.0043495 | 8.9458858 | 0.000 |
| WD3 | −0.0025490 | 0.0043117 | −0.5911886 | 0.558 |
| RW1 | 0.0177917 | 0.0044444 | 4.0031736 | 0.000 |
| RW2 | 0.0142917 | 0.0044444 | 3.2156655 | 0.003 |
| RW3 | −0.0342292 | 0.0044444 | −7.7016565 | 0.000 |
| WD12 | 0.0462576 | 0.0184706 | 2.5043930 | 0.016 |
| WD22 | −0.0379507 | 0.0184706 | −2.0546578 | 0.046 |
| R-squared | 0.854503 | Mean of dependent var | | 0.005307 |
| Adjusted R-squared | 0.821766 | S.D. of dependent var | | 0.059551 |
| S.E. of regression | 0.025141 | Sum of squared resid | | 0.025283 |
| Durbin-Watson stat | 2.389866 | F-statistic | | 26.10212 |
| Log likelihood | 118.7939 | | | |

Clearly, many modifications and variations of the present invention are possible in light of the above teachings and it is therefore understood, that within the inventive scope of the inventive concept, the invention may be practiced otherwise than specifically claimed.

What is claimed is:

1. An improved jet fighter aircraft, wherein the improvement comprises:
    a wing system of three primary lifting surfaces, said wing system being fixedly attached to an airframe of said aircraft, said lifting surfaces being attached at 120 degree intervals about the airframe, each of said three primary lifting surfaces being of substantially equal area and having thereon means for controlling air flow thereby; and
    a rotatable cockpit section, said cockpit section being rotatably independent of said airframe having said wing system of three primary lifting surfaces thereon, said rotatable cockpit section having a pair of canard wings thereon to provide the rotation about an aircraft axis, a pilot of said improved jet fighter aircraft being able to fly said cockpit section with said canard wings where the pilot is subject to substantially only positive g pull during any maneuver, said lifting surfaces and control means thereon responding to movement of said wing system moving said airframe to maintain positive g on the pilot in said cockpit section.

2. An improved jet fighter aircraft, wherein the improvement comprises:
    a wing system of three primary lifting surfaces, said wing system being fixedly attached to an airframe of said aircraft, said lifting surfaces being attached at 120 degree intervals about the airframe, each of said three primary lifting surfaces being of substantially equal area and having thereon means for controlling air flow thereby; and
    a rotatable cockpit section, said cockpit section being rotatable independent of said airframe having three primary lifting surfaces thereon, said rotatable cockpit section having a pair of canard wings thereon to provide the rotation about an aircraft axis, said cockpit section rotatably attached to a spindle, said spindle extending through said cockpit section, said spindle having an aircraft nose attached to a forward end, a pilot of said improved jet fighter aircraft being able to fly said cockpit section with said canard wings where the pilot is subject to substantially only positive g pull during any maneuver, said lifting surfaces and control means thereon of said wing system moving said airframe to maintain positive g on the pilot in said cockpit section.

3. An improved jet fighter aircraft, wherein the improvement comprises:
    a wing system of three primary lifting surfaces, said wing system being rotatably attached to an airframe of said aircraft, said lifting surfaces being attached at 120 degree intervals about said wing system, each of said three primary lifting surfaces being of substantially equal area and having thereon means for controlling air flow thereby; and
    a cockpit section, said cockpit section being fixedly attached to said airframe, said cockpit section having a pair of canard wings thereon to provide the rotation about an aircraft axis, a pilot of said improved jet aircraft being able to fly said cockpit section with said canard wings where the pilot is subject to substantially only positive g pull during any maneuver, said lifting surfaces and control means thereon of said wing system moving said airframe to maintain positive g on the pilot in said cockpit section.

* * * * *